United States Patent [19]

Schimmel et al.

[11] 4,230,552

[45] Oct. 28, 1980

[54] NOVEL PIGMENT GRINDING VEHICLE

[75] Inventors: Karl F. Schimmel, Verona, Pa.; Lance C. Sturni, Delaware, Ohio; Martin J. Robles, Hyattsville, Md.

[73] Assignee: PPG Industries, Inc., Pittsburgh, Pa.

[21] Appl. No.: 59,409

[22] Filed: Jul. 20, 1979

Related U.S. Application Data

[60] Division of Ser. No. 869,197, Jan. 13, 1978, Pat. No. 4,186,124, which is a continuation-in-part of Ser. No. 601,109, Aug. 1, 1975, abandoned.

[51] Int. Cl.$^3$ .............................................. C25D 13/00
[52] U.S. Cl. ...................... 204/181 C; 260/29.2 EP; 260/37 EP; 528/99; 528/104; 560/26; 106/308 N
[58] Field of Search ..................................... 204/181 C

[56] References Cited

U.S. PATENT DOCUMENTS

| | | | |
|---|---|---|---|
| 3,380,881 | 4/1968 | Williamson et al. | 161/885 |
| 3,580,887 | 5/1971 | Hubin | 260/47 |
| 3,922,253 | 11/1975 | Jerabek et al. | 528/45 |
| 3,925,180 | 12/1975 | Jerabek | 204/181 |
| 3,936,405 | 2/1976 | Sturni et al. | 260/29.2 EP |
| 4,069,210 | 1/1978 | Schimmel | 260/29.2 EP |

*Primary Examiner*—Earl A. Nielsen
*Attorney, Agent, or Firm*—William J. Uhl

[57] ABSTRACT

A polymeric product suitble for use as a pigment grinding vehicle is disclosed. The polymeric product is the reaction product of an organic polyepoxide and an organic amine containing an alkylarylpolyether moiety.

5 Claims, No Drawings

NOVEL PIGMENT GRINDING VEHICLE

CROSS-REFERENCE TO RELATED APPLICATIONS

This application is a division of application Ser. No. 869,197, filed Jan. 13, 1978, now U.S. Pat. No. 4,186,124, issued Jan. 29, 1980 which is a continuation-in-part of copending application Ser. No. 601,109, filed Aug. 1, 1975, and now abandoned.

BACKGROUND OF THE INVENTION

1. Field of the Invention

The present invention relates to pigment grinding vehicles and, more particularly, to resinous products suitable for such use. In another aspect, the invention relates to cationic electrocoating employing paints containing novel pigment grinding vehicles.

2. Brief Description of the Prior Art

In the formation of paint compositions, and especially electrodepositable paint compositions, an important factor is the introduction of pigments into the coating composition. The pigments are typically ground in a pigment grinding vehicle which acts as a dispersing agent to form a paste, and the resultant pigment paste is incorporated into the coating composition to give the coating composition proper color, opacity, application and film properties.

Unfortunately, many of the pigment pastes for electrodeposition are mixtures of water-soluble soaps or resins which are not electrodepositable. These pastes remain in the aqueous phase where they pose serious effluent problems.

The present invention overcomes this problem by providing a pigment grinding vehicle which can be made electrodepositable and codepositable with the vehicle resin of the paint.

SUMMARY OF THE INVENTION

In accordance with the present invention, a polymeric product suitable for use as a pigment grinding vehicle is provided. The polymeric product comprises the reaction product of an organic polyepoxide and an organic amine containing an alkylarylpolyether moiety typical of which are represented by the following structural formula:

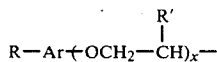

where Ar is an aryl radical; R is an alkyl radical containing from 1 to 30 carbon atoms, R' is hydrogen or lower alkyl containing from 1 to 5 carbon atoms and x is equal to 3 to 20. Besides the polymeric product, the invention also provides for a pigment paste comprising the above-described product in combination with a pigment. Additionally, the present invention provides for a method of electrocoating an electrically-conductive surface serving as a cathode in an electrical circuit comprising a cathode and an anode and an aqueous electrodepositable composition wherein the electrodepositable composition comprises an aqueous dispersion of an amine salt-containing resin or a quaternary ammonium group-containing resin and the aforementioned pigment paste.

The polymeric products of the present invention, besides providing outstanding pigment wetting properties, are co-depositable with the vehicle resin of the electrodeposition paint and thus significantly minimize effluent problems.

DETAILED DESCRIPTION

The organic polyepoxides can be a monomeric or polymeric compound or a mixture of compounds having a 1,2-epoxy equivalency greater than 1.0, that is, in which the average number of 1,2-epoxy groups per molecule is greater than 1. It is preferred that the organic polyepoxide be polymeric or resinous.

The polyepoxide can be any of the well-known epoxides. Examples of these polyepoxides have, for example, been described in U.S. Pat. Nos. 2,467,171; 2,615,007; 2,716,123; 3,030,336; 3,053,855; and 3,075,999. A useful class of polyepoxides are the polyglycidyl ethers of polyphenols, such as Bisphenol A. These may be prepared, for example, by etherification of a polyphenol with epichlorohydrin or dichlorohydrin in the presence of an alkali. The phenolic compound may be bis(4-hydroxy-phenyl)2,2-propane, 4,4'-dihydroxybenzophenone, bis(4-hydroxy-phenyl)1,1-ethane, bis(4-hydroxy-phenyl)1,1-isobutane; bis(4-hydroxy-tertiary-butyl-phenyl)2,2-propane, bis(2-hydroxy-naphthyl)methane, 1,5-hydroxy-naphthalene, or the like. Another quite useful class of polyepoxides are produced similarly from novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, bis-(4-hydroxy-cyclohexyl)2,2-propane, and the like.

There can also be employed polyglycidyl ethers of polycarboxylic acids which are produced by the reaction of epichlorohydrin or a similar epoxy compound with an aliphatic or aromatic polycarboxylic acid, such as oxalic acid, succinic acid, glutaric acid, terephthalic acid, 2,6-naphthalene dicarboxylic acid, dimerized linoleic acid, and the like. Examples are diglycidyl adipate and diglycidyl phthalate.

Also useful are polyepoxides derived from the epoxidation of an olefinically unsaturated alicyclic compound. Included are diepoxides comprising, in part, one or more monoepoxides. These polyepoxides are non-phenolic and obtained by epoxidation of alicyclic olefins, for example, by oxygen and selected metal catalyst, by perbenzoic acid, by acid aldehyde monoperacetate or by peracetic acid. Among the polyepoxides are the epoxy alicyclic ethers and esters which are well known in the art.

Other epoxies which may be employed are acrylic polymers containing epoxy groups and hydroxyl groups. Preferably, these acrylic polymers are polymers produced by copolymerizing an unsaturated epoxy-containing monomer, such as, for example, glycidyl acrylate or methacrylate, a hydroxyl-containing unsaturated monomer and at least one other unsaturated monomer.

Any polymerizable monomeric compound containing at least one CH$_2$=C< group, preferably in the terminal position, may be polymerized with the unsaturated glycidyl compounds. Examples of such monomers include aromatic compounds such as phenyl compounds, for example, styrene, alpha-methyl styrene, vinyl toluene and the like. Also, aliphatic compounds such as olefinic acids and esters, such as acrylic acid, methyl acrylate, ethyl acrylate, methyl methacrylate and the like may be employed.

In carrying out the polymerization reaction, techniques well known in the art may be employed. A peroxygen-type catalyst is ordinarily utilized; diazo compounds or redox catalyst systems can also be employed as catalysts.

The preferred hydroxy-containing unsaturated monomers are hydroxyalkyl acrylates, for example, hydroxyethyl acrylate or methacrylate or hydroxypropyl acrylate or methacrylate may be used.

Another method of producing acrylic polymers which may be utilized in the present invention is to react an acrylic polymer containing reactive sites, including hydroxyl groups, with an epoxy-containing compound such as diglycidyl ether of Bisphenol A or other polyepoxides as enumerated elsewhere herein, to provide epoxy group-containing hydroxyl group-containing acrylic polymers.

The organic amine containing an alkylarylpolyether moiety can be a secondary amine or a tertiary amine acid salt which is capable of reacting with and opening the epoxide moiety to form basic nitrogen-containing adducts. In the case of secondary amines, the adduct contains tertiary amine groups and in the case of tertiary amine acid salts, quaternary ammonium-containing adducts are formed. The tertiary amine-containing adducts are usually insoluble in water and can be solubilized by treating with acid.

The acid used for solubilizing the tertiary amine adduct and the acids of the tertiary amine acid salts preferably are acids having a $pK_a$ less than 5 such as hydrochloric acid, sulfuric acid and boric acid. Preferably, the acid is an organic acid such as acetic acid and lactic acid, with lactic acid being the most preferred.

As has been mentioned above, the organic amine contains an alkylarylpolyether moiety, typical of which is represented by the following structural formula:

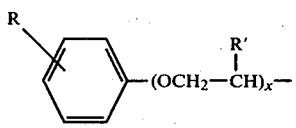

where R is an alkyl radical containing from 1 to 30 carbon atoms and R' is hydrogen or lower alkyl containing from 1 to 5 carbon atoms and x is equal to 3 to 20. Preferably, R is a branched alkyl group containing secondary, tertiary or both secondary and tertiary carbon atoms. In the most preferred embodiment, R is octyl.

In the above structural formula, the aryl radical is represented by the phenyl ring. It should be appreciated, however, that other aryl radicals such as naphthyl, phenanthryl and amanthryl can be used.

In one embodiment of the invention, the organic amine containing an alkylarylpolyether moiety can be prepared by reacting an alkylarylpolyether which contains an active hydrogen such as hydroxyl with an organic diisocyanate to form a half-capped isocyanate product. An organic amine containing active hydrogens such as a hydroxyl-containing tertiary amine can then be reacted with a half-capped isocyanate to form the desired adduct. In a preferred embodiment of the invention, toluene diisocyanate is half-capped with an octyl phenyl-ethylene oxide adduct having the following structural formula:

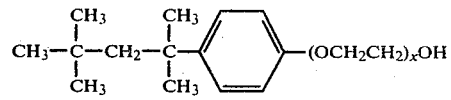

where x is equal to 12 to 13. The half-capped adduct is then fully capped with dimethyl ethanolamine to form a tertiary amine adduct containing an alkylarylpolyether moiety which also contains urethane linkages.

To make the polymeric product of the invention, preferably two moles of the organic monoamine containing an alkylarylpolyether moiety are reacted with one mole of an organic diepoxide to form an adduct in which the alkylarylpolyether groups are in the terminal position on the polymer chain. This provides a polymeric product with the most desirable pigment dispersing properties. The reaction proceeds at room temperature in most cases and, in some cases, exothermically, so that moderate cooling may be necessary. In some cases, moderately elevated temperature can be used and is preferred. Typically, the reaction is conducted between about 50° C. and 100° C. The reaction may be conducted in the presence of a solvent if desired. If a solvent is employed, preferably it is capable of being used in the ultimate composition which is formed. For example, alcohols, ketones and glycol ethers may be used.

For suitable pigment pastes for use in electrodeposition, the amounts of organic polyepoxide and organic amine containing an alkylarylpolyether moiety should be selected so that the final polymeric product contains about 0.3 to 1.5, preferably 0.4 to 0.7 milliequivalents of basic nitrogen per gram of resin. Lower milliequivalents of basic nitrogen per gram of resin, i.e., lower than 0.3, are undesirable because the resin will have poor pigment wetting properties, whereas higher milliequivalents of basic nitrogen per gram of resin, i.e., higher than 1.5, are undesirable because the resin may become too water soluble.

The pigment pastes of the present invention are prepared by grinding or dispersing a pigment into the polymeric products described above in a manner well known in the art. The pigment paste comprises as essential ingredients basic nitrogen-containing adducts of the invention and at least one pigment; however, the paste may, in addition, contain optional ingredients such as plasticizers, wetting agents, surfactants or defoamers.

Grinding is usually accomplished by the use of ball mills, sand mills, Cowles dissolvers, continuous attritors and the like until the pigment has been reduced to the desired size and preferably has been wet by and dispersed by the grinding vehicle. After grinding, the particle size of the pigment should be in the range of 10 microns or less, preferably as small as practicable. Generally, a Hegman grind gauge reading of about 6-8 is usually employed.

Preferably, grinding is conducted in an aqueous dispersion of the vehicle. The amount of water present in the aqueous grind should be sufficient to produce a continuous aqueous phase. The aqueous grind usually contains about 30 to 70 percent total solids. The use of more water merely reduces the effective capacity of the mill and, while less water can be employed, higher resultant viscosity may create problems in certain instances. Although the pigment paste is usually prepared in the presence of water, water is not absolutely necessary and in fact the pigment dispersants of the present invention can be used to prepare non-aqueous pigment pastes which are subsequently dispersible in water-based compositions.

The pigment-binder ratio in the grinding step is usually maintained within the range of about 2/1 to 7/1.

Pigments which may be employed in the practice of the invention are pigments well known in the art. Generally titanium dioxide is the sole or chief white pigment; other white pigments and/or extender pigments include antimony oxide, zinc oxide, basic lead carbonate, basic lead sulfate, barium carbonate, China clay, calcium carbonate, aluminum silica, silica, magnesium carbonate, magnesium silica, among others. Color pigments may also be employed, for example, cadmium yellow, cadmium red, carbon black, phthalocyanine blue, chrome yellow, toluidine red, hydrated iron oxide, among others.

For a general review of pigment grinding and paint formulation, reference may be had to:

D. H. Parker, *Principles of Surface Coating Technology*, Interscience Publishers, New York (1965)

R. L. Yates, *Electropainting*, Robert Draper Ltd., Teddington, England (1966)

H. F. Payne, *Organic Coating Technology*, Vol. 2, Wiley and Sons, New York (1961).

The pigment paste of the present invention is usually combined with an amine group-containing resinous vehicle known in the art for cationic electrodeposition. The amine group-containing cationic electrodepositable resins are well known in the art and need not be described in any detail. Examples of suitable resins include those described in U.S. Pat. No. 3,799,854 to Jerabek and U.S. Pat. No. 3,839,252 to Bosso et al. The portions of these references which describe suitable electrodepositable resins are hereby incorporated by reference.

Enough of the pigment paste is used so that the final electrodepositable composition (electrodepositable resin plus pigment paste) has the properties required for electrodeposition. In most instances, the final electrodepositable composition has a pigment-to-binder (electrodepositable resin plus pigment dispersant) ratio of between about 0.05 to about 0.5.

For electrodeposition, a bath containing about 5 to 25 percent by weight solids, that is, pigment plus resinous vehicle, is usually employed. This aqueous composition is then placed in contact with an electrically-conductive anode and an elecrically-conductive cathode in an electric circuit. While in contact with the bath containing the coating composition, an adherent film of the coating composition is deposited on the cathode.

The conditions under which the electrodeposition is carried out are, in general, similar to those used in electrodeposition of other types of coatings. The applied voltage may be varied greatly and can be, for example, as low as one volt or as high as several thousand volts, although typically between 50 volts and 500 volts are usually employed. The current density is usually between about 0.25 ampere and 15 amperes per square foot, and tends to decrease during electrodeposition.

The method of the invention is applicable to the coating of any conductive substrate and especially metal, such as steel, aluminum, copper and the like.

After deposition, the coating is cured at elevated temperatures by any convenient method, such as in baking ovens or with banks of infrared heat lamps.

The final electrodepositable composition may contain, in addition to the pigment dispersion and the electrodeposition resin, adjuvant resins such as aminoplast resins for crosslinking, solvents, anti-oxidants, surfactants and other adjuvants typically employed in an electrodeposition process.

Illustrating the invention are the following examples which are not to be construed as limiting the invention to their details. All parts and percentages in the examples, as well as throughout the specification, are by weight unless otherwise specified.

EXAMPLE I

A polymeric product suitable for use as a pigment grinding vehicle was prepared from the following charge:

| Charge | Parts by Weight | Solids |
|---|---|---|
| EPON 829[1] | 400 | 383.8 |
| Bisphenol A | 136.8 | 136.8 |
| Organic amine containing alkylaryl-polyether moieties[2] | 792 | 792 |
| Aqueous lactic acid solution | 96 | 72 |
| Deionized water | 113.7 | — |

[1]Epoxy resin solution made from reacting epichlorohydrin and Bisphenol A, having an epoxy equivalent of approximately 193-203 and commercially available from Shell Chemical Company.
[2]This component was made bu charging 174 parts by weight of toluene diisocyanate and 727 parts by weight of an alkylarylpolyether having the following structure:

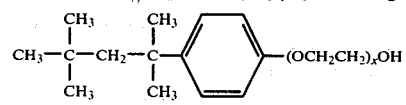

where x is equal to 12 to 13, commercially available from Rohm and Haas as TRITON X-102, to a reaction vessel. The reaction was permitted to exotherm at 30°-35° C. with stirring for two hours, after which time 89 parts by weight of dimethyl ethanolamine was added. The reaction mixture was again permitted to exotherm for an additional two hours to form the desired reaction product.

The EPON 829 and the Bisphenol A were charged to a suitable reaction vessel and heated to 155°-160° C. and permitted to exotherm for one hour. The organic amine, lactic acid and deionized water were then added and the reaction mixture held for one hour at 80°-85° C. to form the desired reaction product.

EXAMPLE II

A pigment paste ground to a Hegman No. 7 containing the polymeric product of Example I was prepared from the following charge:

| Charge | Parts by Weight |
|---|---|
| Resin of Example I | 125.0 |
| Titanium dioxide | 592.2 |
| Red iron oxide | 2.5 |
| Carbon black | 5.1 |
| Dibutyltin diacetate | 7.2 |
| Deionized water | 315 |

EXAMPLE III

A cationic electrodepositable resin was prepared from the following charge:

| Charge | Parts by Weight | Solids |
|---|---|---|
| EPON 829 | 5428 | 5208.3 |
| Bisphenol A | 1752.3 | 1752.3 |

-continued

| Charge | Parts by Weight | Solids |
|---|---|---|
| 2-Ethylhexyl-half capped toluene diisocyanate | 3705.5 | 3705.5 |
| PCP-0200[1] | 1424.8 | 1424.8 |
| TEXANOL[2] | 1167.3 | — |
| Dimethyl ethanolamine | 25.8 | 25.8 |
| Aqueous lactic acid solution | 52.3 | 39.5 |
| Phenyl CELLOSOLVE[3] | 1830.5 | — |
| Ethyl CELLOSOLVE[4] | 857.0 | — |
| FOAM KILL 639[5] | 66.5 | 66.5 |
| Aqueous dimethyl cyclohexyl amine-lactic acid salt solution | 1600.7 | 1200.5 |
| Deionized water | 857.0 | — |

[1] Polycaprolactone diol having a molecular weight of 540 formed from ring opening epsilon-caprolactone with diethylene glycol, commercially available from Union Carbide Corporation.
[2] 2,2,4-trimethylpentanediol-1,3-monoisobutyrate.
[3] Ethylene glycol monophenyl ether.
[4] Ethylene glycol monoethyl ether.
[5] Hydrocarbon oil-containing diatomaceous earth surfactant.

The resin was prepared by charging the EPON 829 and Bisphenol A to a suitable reaction vessel and heating to exotherm, the highest temperature being 215° C. Reaction was controlled at 150°–215° C. for one hour and the reaction mixture cooled to 125° C. and charged with the half-capped toluene diisocyanate. The reaction mixture was held for one hour at 120° C. followed by the addition of the PCP-0200 and the TEXANOL. After the addition of these ingredients, the dimethyl ethanolamine was added and the reaction mixture maintained at 125°–130° C. for seven hours until the Gardner-Holdt viscosity was M+ at 25° C. The lactic acid, phenyl CELLOSOLVE, ethyl CELLOSOLVE and FOAM KILL 639 were then charged over a period of 30 minutes followed by the addition of the dimethyl cyclohexylaminelactic acid salt. The reaction mixture was digested at 90°–95° C. for two hours to form and clarify the resinous product of the invention which had a solids content of 46.3 percent.

The above-described vehicle was combined with the pigment paste of Example II and deionized water in the following charge ratio to form a 10 percent solids electrodeposition bath.

| Charge | Parts by Weight | Resin Solids | Pigment Solids |
|---|---|---|---|
| Cationic electrodepositable resin | 351.0 | 263.2 | — |
| Pigment paste of Example II | 145.0 | 13.8 | 83.0 |
| Deionized water | 3104.0 | — | — |

Zinc phosphated steel panels were coated with this bath at a temperature of 27° C. at 400 volts for 90 seconds to produce continuous films.

EXAMPLE IV

A pigment paste ground to a Hegman No. 7 was prepared from the following charge:

| Charge | Parts by Weight | Solids |
|---|---|---|
| Pigment grinding vehicle of Example I | 121.7 | 100 |
| Titanium dioxide | 472.2 | 472.2 |
| Aluminum silicate | 120.0 | 120.0 |
| Red iron oxide | 2.5 | 2.5 |
| Carbon black | 5.1 | 5.1 |
| Deionized water | 284.7 | — |

EXAMPLE V

An electrodeposition bath containing 10 percent total solids was prepared from the thermosetting cationic composition described in Example III and the pigment paste of Example IV in the following charge ratio:

| Charge | Parts by Weight | Resin Solids | Pigment Solids |
|---|---|---|---|
| Cationic electrodepositable resin of Example III | 717.6 | 502 | — |
| Pigment paste of Example IV | 312.8 | 31.1 | 186.6 |
| Dibutyltin diacetate | 6.0 | — | — |
| Deionized water | 6163.0 | — | — |

When the electrodeposition bath at a temperature of 27° C. was used to coat zinc phosphated steel panels at 300 volts for 90 seconds, continuous films were produced which, after curing for 20 minutes at 196° C., were glossy, hard and acetone-resistant.

EXAMPLE VI

A polymeric product similar to Example I and suitable for use as a pigment grinding vehicle was prepared from the following charge:

| Charge | Parts by Weight | Solids |
|---|---|---|
| EPON 829 | 400 | 383.8 |
| Bisphenol A | 136.8 | 136.8 |
| Organic amine containing an alkyl-arylpolyether moiety of Example I | 673.4 | 673.4 |
| Aqueous lactic acid solution | 78 | 58.5 |
| Deionized water | 62.6 | — |
| Methyl ethyl ketone | 214.8 | — |

The EPON 829 and the Bisphenol A were charged to a suitable reaction vessel and heated to exotherm at 155° C. and held for one hour. The reaction mixture was cooled to 100° C. and the methyl ethyl ketone added. The reaction mixture was agitated and heated to reflux followed by the addition of the amine, lactic acid and deionized water. The reaction mixture was further heated at 80°–90° C. for about one hour to form the desired reaction product.

EXAMPLE VII

A pigment paste ground to a Hegman No. 7 and containing the polymeric product of Example VI was prepared from the following charge:

| Charge | Parts by Weight | Solids |
|---|---|---|
| Resin of Example VI | 121.7 | 100 |
| Titanium dioxide | 472.2 | 472.2 |
| Aluminum silicate | 120.0 | 120 |
| Red iron oxide | 2.5 | 2.5 |
| Carbon black | 5.1 | 5.1 |
| Deionized water | 309.7 | — |

EXAMPLE VIII

A cationic electrodepositable resin was prepared from the following charge:

| Charge | Parts by Weight | Solids |
|---|---|---|
| EPON 829 | 1203.5 | 1155.7 |
| Bisphenol A | 207.0 | 207.0 |
| Polypropylene glycol (molecular | | |

| Charge | Parts by Weight | Solids |
|---|---|---|
| weight = 625) | 542.3 | 542.3 |
| Dimethyl ethanolamine | 3.6 | 3.56 |
| 75% by weight aqueous lactic acid solution | 7.1 | 6.0 |
| FOAM KILL 639 | 12.6 | 12.6 |
| TEXANOL | 402.2 | — |
| Isopropanol | 55.0 | — |
| Dimethyl ethanolamine lactic acid salt (75% solids in isopropanol) | 96.0 | 71.98 |
| Deionized water | 92.0 | — |
| Boric acid | 5.0 | 5.0 |
| Deionized water | 2550 | — |
| Boric acid | 5.9 | 5.9 |
| XM-1123[1] | 326.2 | 326.2 |
| Isopropanol | 69.0 | — |
| METHYLON 75202[2] | 197.0 | 128.0 |
| Isopropanol | 58.3 | — |

[1] XM-1123 benzoguanamine-formaldehyde resin commercially available from American Cyanamid Company.
[2] Unsaturated methylol phenol ether commercially available from General Electric Company.

The EPON 829 and Bisphenol A were charged to a suitable reaction vessel and heated to 150° C. to exotherm with the highest temperature being 160° C. The reaction temperature was controlled between 150°–160° C. for one hour, after which time the polypropylene glycol was charged to the reaction vessel followed by the addition of the dimethyl ethanolamine. The reaction temperature was held at about 135° C. for about six hours until the Gardner-Holdt viscosity at 25° C. was M+. The reaction mixture was then charged with TEXANOL, isopropanol and FOAM KILL and digested for 45 minutes at 115°–130° C. The lactic acid was then charged and the reaction mixture cooled to 98° C., followed by the addition of the dimethyl ethanolamine lactic, the first portion of deionized water and boric acid. After the addition of these ingredients, the temperature was held at 90°–95° C. for 45 minutes, lowered to 70° C. and the second portion of deionized water and boric acid added. After this addition, the reaction mixture was charged with XM-1123 and the first portion of isopropanol. The reaction mixture was digested for 30 minutes at 65° C. and then charged with the METHYLON and the second portion of isopropanol. The reaction mixture was further digested for four hours at 56°–62° C. to clarify the reaction product. The final product contained 71.2 percent total solids and had a Brookfield viscosity of 22,000 centipoises (No. 7 spindle at 20 rpm's).

The above resin was combined with the pigment paste of Example VII and deionized water to form a 10 percent solids electrodeposition bath. The charge ratio for forming the bath was as follows:

| Charge | Parts by Weight | Resin Solids | Pigment Solids |
|---|---|---|---|
| Cationic electrodepositable resin | 376.0 | 263.2 | — |
| Pigment paste of Example VII | 142.5 | 13.8 | 83.0 |
| Deionized water | 3081.6 | — | — |

The above bath when used to coat zinc phosphated steel panels at 200 volts for 90 seconds (bath temperature 27° C.) produced continuous films which when baked at 246° C. for 20 minutes were hard and acetone-resistant films of a thickness of approximately 0.70 mil.

EXAMPLE IX

A non-aqueous pigment paste ground to a Hegman No. 7 containing the polymeric product of Example I was prepared from the following charge:

| Charge | Parts by Weight |
|---|---|
| Resin of Example I | 97.4 |
| Butyl CELLOSOLVE[1] | 230 |
| Titanium dioxide | 342 |
| Chrome yellow pigment | 38.2 |
| Medium chrome yellow pigment | 9.5 |

[1] Ethylene glycol monobutyl ether.

We claim:

1. A method of electrocoating an electrically conductive surface serving as a cathode in an electrical circuit comprising said cathode and an anode in an aqueous electrodepositable composition by passing an electric current between said anode and said cathode, wherein the electrodepositable composition comprises an aqueous dispersion of a polymeric product comprising the acidified reaction product of:
   (A) a polymeric polyepoxide having a 1,2-epoxy equivalency greater than one,
   (B) an organic tertiary amine containing an alkylarylpolyether moiety having the following structural formula:

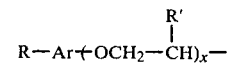

where Ar is an aryl radical, R is an alkyl radical containing from 1 to 30 carbon atoms, R' is hydrogen or lower alkyl containing from 1 to 5 carbon atoms and x is equal to 3 to 20.

2. The method of claim 1 in which the alkylarylpolyether moiety is located in the terminal position on the polymer chain.

3. The method of claim 1 in which the polyepoxide is the polyglycidyl ether of a polyphenol.

4. The method of claim 1 in which the alkylarylpolyether moiety has the following structural formula:

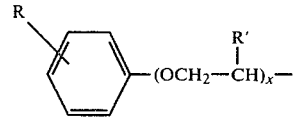

where R is an alkyl group containing from 1 to 30 carbon atoms, R' is hydrogen or lower alkyl containing from 1 to 5 carbon atoms and x is equal to 3 to 20.

5. The method of claim 1 in which (B) is formed from reacting:
   (1) an alkylarylpolyether alcohol,
   (2) an organic diisocyanate,
   (3) a hydroxyl-containing tertiary amine.

* * * * *